April 20, 1937.  E. SCHIMANEK  2,077,775
METHOD FOR THE AUTOMATIC CONTROL OF THE POWER OUTPUT OF AIRCRAFT ENGINES
Filed Sept. 28, 1934
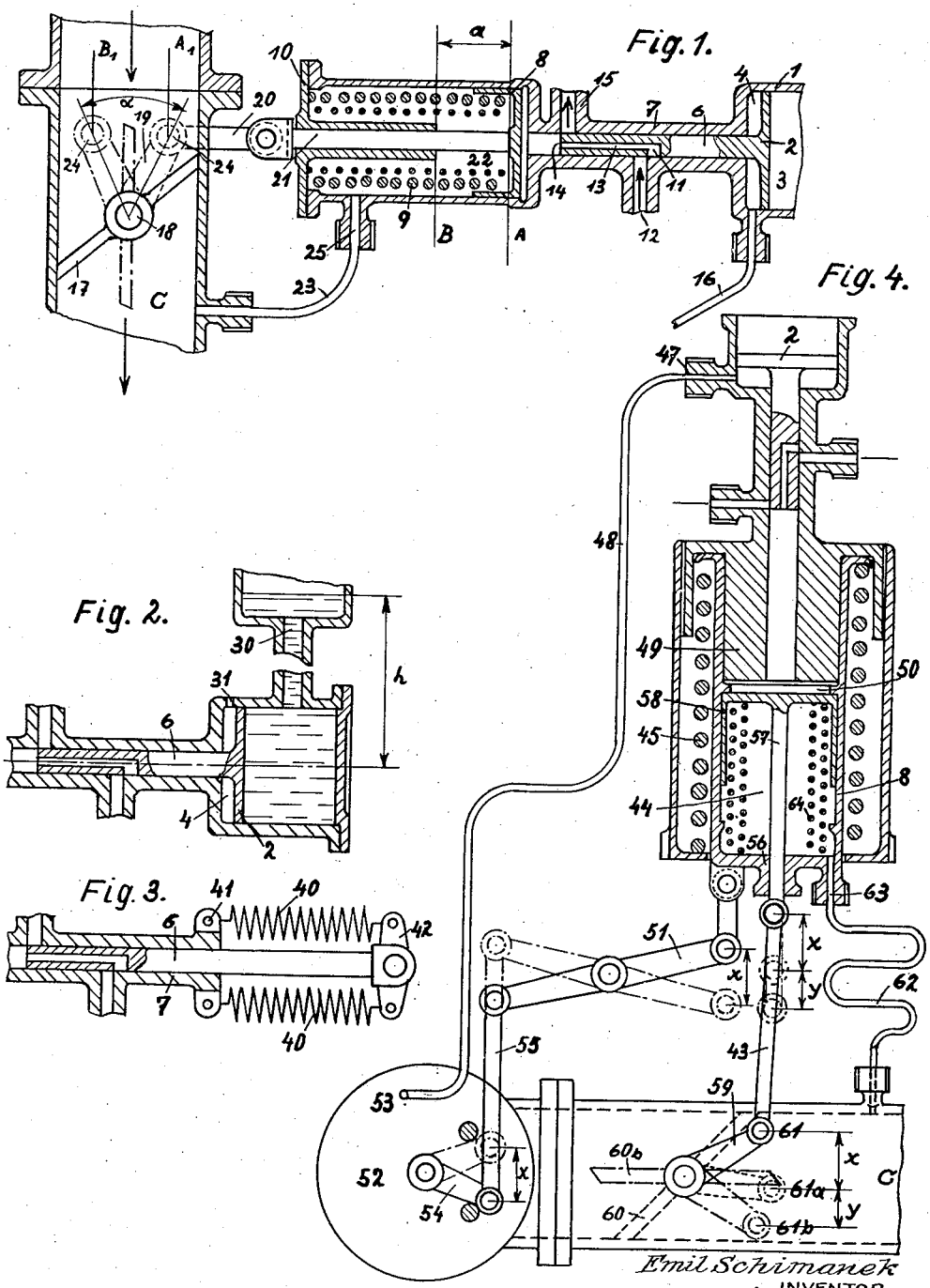

Patented Apr. 20, 1937

2,077,775

UNITED STATES PATENT OFFICE 2,077,775

METHOD FOR THE AUTOMATIC CONTROL OF THE POWER OUTPUT OF AIRCRAFT ENGINES

Emil Schimanek, Budapest, Hungary, assignor to the firm Societe du Carburateur Stratos, Paris, France Application September 28, 1934, Serial No. 745,973
In Germany September 30, 1933

6 Claims. (Cl. 137—153)

This invention relates generally to aircraft engines. It is known that the power of aviation engines varies with the altitude of flight on account of the variation of the specific weight of the air. The variation in specific weight manifests itself in two ways: 1, by altering the composition of the mixture at the carburettor and 2, by altering the filling of the motor cylinder.

In United States Letters Patent No. 1,991,296 is shown apparatus for the automatic regulation of the carburettor in accordance with the height, by means of an organ sensible to pressure which organ is subjected on the one side to a constant gas or fluid-pressure and on the other side to the external atmospheric pressure and a spring, said regulation being characterized in that the gas or fluid-pressure is kept constant by controlling the admission of the gas or fluid which is supplied under higher pressure to, and the discharge from, the pressure chamber, the pressure of which is to be kept constant, by means of a piston-like organ acted on in the one direction by the pressure to be kept constant and in the other direction by a constant force, and being so dimensioned that it is in equilibrium when the pressure to be kept constant has the desired value.

The power regulation of aviation engines has, however, to a high degree also the object to prevent the overloading of the motor or of its parts by excessive forces when the motor is working at low altitudes. Without regulation the filling of the motor cylinder would take place near the surface of the earth at a pressure having a higher value than the pressure at which the filling takes place at high altitudes for which the motor and its parts are designed. This enlargement of the pressures and the forces thereby caused shall be prevented by an automatic regulation. The highest pressure at which the cylinder is filled—which pressure, as is known, would arise when the throttle-valve is entirely open—shall never surpass the filling pressure which has been assumed for a predetermined height when designing the motor power. There are various methods and devices known in which this regulation is attained by the automatic adjustment of the throttling action in different ways.

According to the present invention the above mentioned method as disclosed in United States Letters Patent No. 1,991,296 is used to automatically maintain the pressure whereat the motor cylinder is filled at a predetermined altitude, by subjecting the pressure-sensible organ which is acted upon on the one side by the constant gas or fluid pressure, on the other side to the gas pressure to be kept constant (filling pressure or a pressure having a certain relation thereto) and preferably also to an approximately constant spring-pressure. Such a spring action may be obtained by employing a multiple-wound spring or a plurality of coacting springs, so that the deformation which takes place during the regulation will alter the spring pressure only within very narrow predetermined limits.

The invention is illustrated by way of example in the accompanying drawing, wherein Figure 1 is a sectional view of an improved carburettor showing one form of the present invention.

Figure 2 is a sectional view of a modified form of device for actuating the fluid pressure control means.

Figure 3 is a sectional view of another modified form of device for actuating the pressure fluid control means.

Figure 4 is a sectional view of a carburettor and associated parts embodying still another form of the invention.

The device employed for producing the constant oil or gas-pressure is similar to that shown in Figure 1 of Patent No. 1,991,296. A pipe or conduit 16 leads to a chamber of the carburettor (not shown) in which chamber there is a constant partial vacuum, that is to say a pressure which is lower than atmospheric by a constant amount. The pipe 16 is connected to the chamber 4 of a cylinder whereby a constant force is exerted on the piston 2 which controls the admission and discharge of the pressure-oil or gas to the pressure space on the right side of the piston 8. Atmospheric pressure exists in the chamber 3 on the outer side of piston 2. On the left side of the piston 8, a pressure is exerted which is to be kept constant by the device. In the construction according to Fig. 1 this is the pressure which exists at the point C of the pipe leading to the motor. This pressure is regulated by a throttle valve 17 pivotable about the axis 18 and adjustable by the lever 19. This lever 19 is connected to the piston 8 by means of a plate-member 20 and the piston rod 21. Every movement of the piston 8, therefore, is correspondingly transmitted to the throttle valve 17. In the drawing $A^1$ indicates the position of the pin 24 of the lever 19 whereat the throttle valve completely cuts off the admission of air to the motor. This position of the lever corresponds to the position A of the piston 8. The piston can move a distance $a$ to the left. At the outermost left position B of the piston 8 the pin 24 of the lever 19 is in the position B¹, and the throttle valve is completely open.

The manner in which this example of construction works is as follows:

If the motor is working near to the ground the piston is near to the position A and opens the throttle valve 17 only so far that the pressure occurring in the space 22, which is transmitted from the point C of the suction-conduit of the motor through the connection 23 at the point 25 to the cylinder space 22, in cooperation with the spring-pressure 9, balances the constant oil or gas pressure exerted on the right side of the piston 8 in the pressure space. If the aeroplane now takes a higher flight and the atmospheric pressure becomes lower, the pressure in the space C is also lowered. On account of that the piston 8 is displaced by the constant oil or gas-pressure acting on its right side until the throttle valve 17 has been opened by this displacement of the piston to such an extent that the pressure in the space 22 again assumes its former value which, in cooperation with the constant spring-pressure, balances the oil and gas-pressure acting on the right side of the piston in the pressure-space which pressure is maintained constant. Thereby the object is accomplished to maintain constant the pressure at the point C and also the filling pressure of the cylinder.

The example of construction shown in Fig. 2 is not altered as to the part which lies to the left of the regulating piston 8, that is to say as to the connection of the regulating piston 8 with the throttle valve. The only difference is that, in place of the partial vacuum supplied in Fig. 1 from the chamber of the carburettor to the space 4, a sub-pressure is provided by means of the liquid column 30 of the height h, which acts on the right side of the piston 2 and is substituted for the partial vacuum acting in the previous example on the left side of this piston. The space 4 behind the piston 2, in this case, is connected with the atmosphere by the opening 31.

In Fig. 3, in place of a partial vacuum derived from a carburettor or a hydraulic sub-pressure produced by a liquid column which acts on the surface of the piston 2, a mechanical force acting on the piston 6 is provided. The springs 40 which are attached on the one side to the cylinder 7 in suitable eyes 41 and on the other side to the piston 6 by means of a lever 42, urge the piston 6 towards the left just the same as in the case of Fig. 1 the partial vacuum in the carburettor and in case of Fig. 2 the sub-pressure of the fluid column. Of course, the springs 40 must be dimensioned in such manner that the spring-force remains as constant as possible within the limits in which the piston 6 is moved during the regulation of the admission and the discharge of the pressure-fluid or gas. This can be achieved in any desired approximation by the employment of several multiple-wound springs.

The spring-pressure of course may be also transmitted to the piston 2 through the intermediary of a spring-loading of a member (lever, rod or the like) inserted in the cinematic chain serving for the regulation.

It is also possible to use in combination several of the devices described for the production of a constant gas or fluid pressure. Thus, for instance, the partial vacuum derived from the carburettor (as in Fig. 1) and at the same time the spring-pressure (as in Fig. 3) may cooperate in order to control the constant gas or fluid pressure. Or the partial vacuum derived from the carburettor may be brought to action on the left side of the piston 2, as shown in Fig. 1, and simultaneously the hydraulic sub-pressure, as shown in Fig. 2, on the right side of the piston 2, so that the two pressures will cooperate to produce the constant force acting towards the left. There may be also all three ways of producing the force employed. The technical advantage thereby obtained lies in the possibility to construct the piston 2 comparatively smaller for the attainment of an equally large effect, whereby not only a smaller apparatus is made possible, but also a greater sensitiveness of the apparatus is obtained, since the resistance against the regulation-displacement becomes smaller in proportion to the force.

The method described in the above mentioned patent, which serves for regulating the composition of the mixture, may be combined with the method for controlling the motor-power described in the present application; that is to say both regulations may be carried out by the same apparatus, viz. in such a manner that the displacement of the regulating organ required for the attainment of the one regulation is simultaneously used for the partial performance of the second regulation so that only a supplementing of the latter regulation by the apparatus is required.

In Fig. 4 a form of construction is shown by way of example, in which the movement of the regulating piston 8 required for the height-regulation of the carburettor is also used for the control of the power output of the motor; and, then, a second regulating piston 58 effects the supplementary or additional movement required for the definite power control.

In Fig. 4, the regulating piston 8 which serves for the regulation of the carburettor mixture and the partial regulation of the motor power is put on the cylinder 49. A second regulating piston 58 which serves for the additional regulation of the motor power is inserted in the piston 8 so that the latter forms the cylinder of the piston 58. The gas or oil under constant pressure is controlled by the piston 2, as shown in the other figures. In Fig. 4 the construction is employed which has been shown in Fig. 1, in which the piston 2 is subjected on its upper side to the pressure of the atmosphere, on its underside, however, to the pressure which exists in the carburettor 52 in the mixing chamber and is supplied through the conduit 48 to the point 47 behind the piston. The piston 8 is closed at its outside beneath by the bottom 56. The space which is enclosed on the one side by this bottom and on the other side by the piston 58 guided in the piston 8, is connected by means of the conduit 62, to the space C wherein the pressure is to be kept constant by the adjustment of the throttle value 60. Between the piston 58 and the piston-bottom 56 a multiple-wound spring 64 is arranged. Thus the piston 58 is loaded on the one side by the constant gas or fluid pressure and on the other side by the pressure existing in the space C and supplied therefrom behind the piston 58, and by the spring 64. The piston 8 is subjected to the pressure of the spring 45 and the atmospheric pressure prevailing at the time on its under side, and to the pressure of the spring 64 and the gas pressure existing in the space 44 on its upper side. Since the latter two pressures are balanced by the gas or fluid pressure existing in the space 50, the piston 8, in fact, is loaded from the upper side by the gas or fluid pressure existing in the space 50, which pressure is transmitted to the piston-bottom 56 by the spring 64 and the gas pressure occurring in space 44.

The piston 8 is connected to the lever 54 which regulates the mixture, by means of the lever 51 and the connecting rod 55. The piston 58, however, is connected to the lever 59 at the pin 61, by means of the piston rod 57 and the connecting piece 43. By means of the lever 59 the throttle valve 60 is adjusted which is arranged in the suction conduit of the motor or in the suction or pressure-conduit of the compressor. This throttle valve controls the pressure in the space C.

The way in which the device shown in Fig. 4 works is as follows: If the aircraft is flying along the ground the two pistons 8 and 58 are in the position shown in Fig. 4. If, now, the aircraft rises and the atmospheric pressure falls, the piston 8 will gradually sink and, thereby, take also the piston 58 along with it. The higher the aircraft rises the greater becomes the way the piston 8 will have sunk until at the height for which the motor is designed, that is to say at the height at which the motor shall still have the same power output as at the ground, the piston 8 will have reached its lowest position after having covered the way $x$. The spring 45 is so dimensioned that, by the compression $x$, it exerts so much more force as is lacking on account of the smaller atmospheric pressure. The displacement of the piston 8 over the way $x$ regulates the mixture by the turning of the lever 54 to an extent corresponding to this height.

By the fact that the piston 58 is taken along with the piston 8 also a regulation of the motor power corresponding to the displacement $x$ takes place. The connection between the lever 59 and the piston 58 must be such that the regulation of the motor power caused by the displacement $x$ does not suffice and an additional regulation is required. The fact that the regulation is not sufficient manifests itself in that in the space C a smaller pressure arises than is required. Thus, in the space 44 this smaller pressure arises, whereby the piston 58 is moved downwards until the throttling which thereby is diminished reaches a degree at which the desired pressure will exist in the space C.

What I claim is:

1. Apparatus for the automatic control of the power output of aircraft engines for greater altitudes, including a pressure-sensitive regulating organ which is at all altitudes on the one side under the influence of a constant gas or fluid pressure, and on the other side subjected to a constant gas pressure to be kept constant and an approximately constant spring pressure.

2. Apparatus as claimed in claim 1, characterized in that the regulating organ which controls the admission and the discharge of the pressure gas or fluid is at all altitudes loaded in the one direction by at least two cooperating constant forces, and is subjected in the other direction to the action of the constant pressure of the pressure-fluid or gas.

3. Apparatus for regulating the power output of aircraft engines comprising in combination a piston under the influence of pressure fluid on one side and constant spring and air pressure on the other side at all altitudes, mechanism for automatically regulating the flow of pressure fluid and mechanism for automatically regulating the constant air pressure.

4. Apparatus for regulating the power output of aircraft engines comprising in combination a piston under the influence of constant fluid pressure on one side and constant spring and air pressure on the other side at all altitudes, mechanism for automatically regulating the flow of pressure fluid and mechanism for automatically regulating the constant air pressure including a valve and an operative connection between the valve and piston.

5. Apparatus for regulating the power output of aircraft engines comprising in combination a piston under the influence of constant fluid pressure on one side and constant spring and air pressure on the other side, mechanism for automatically regulating the flow of fluid pressure including a piston and a fluid connection between said piston and mechanism for automatically regulating the constant air pressure including a valve and an operative connection between the valve and first named piston.

6. Apparatus for regulating the power output of aircraft engines comprising in combination a cylinder, a piston therein under the influence of fluid pressure on one side, a constant spring pressure against the other side of said piston, an air pipe leading to the motor, means of communication between the interior of said cylinder and said pipe and mechanism for keeping the air pressure in said cylinder constant at all altitudes, said mechanism including a valve in said pipe and an operative rigid connection between the piston and valve for automatically actuating the latter.

EMIL SCHIMANEK.